Oct. 23, 1928.
E. P. SHELDON
1,688,835
PAPER BREAK INDICATOR
Filed Sept. 3, 1925
3 Sheets-Sheet 2
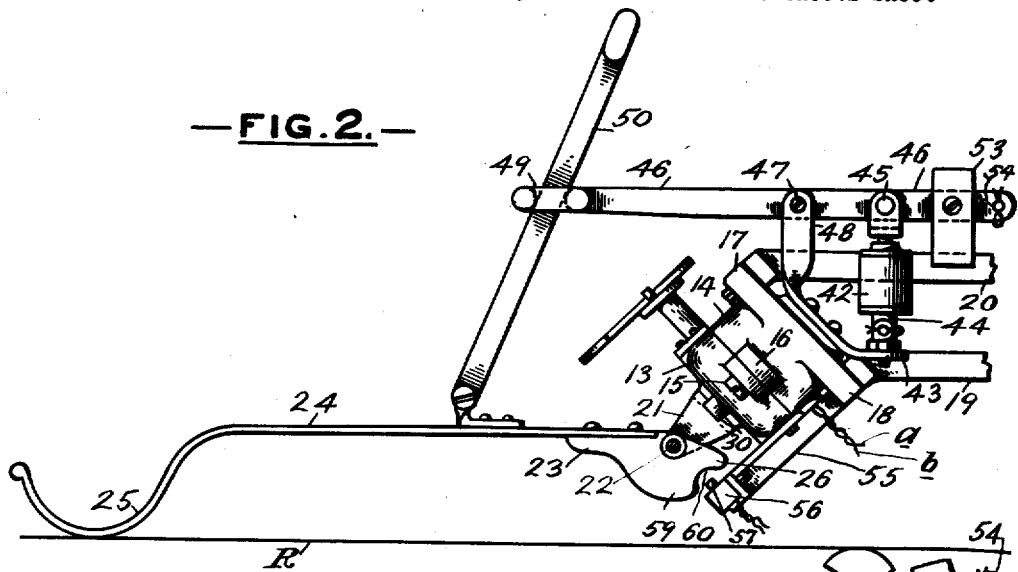
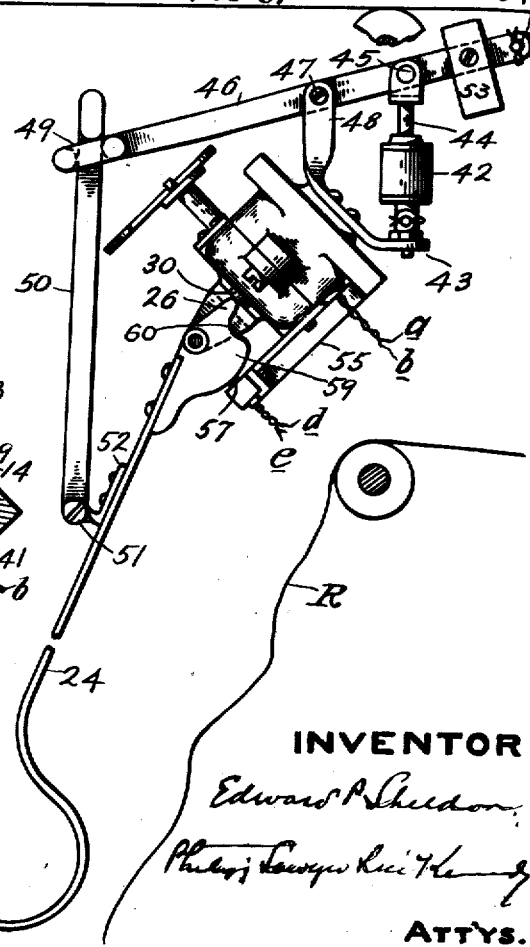
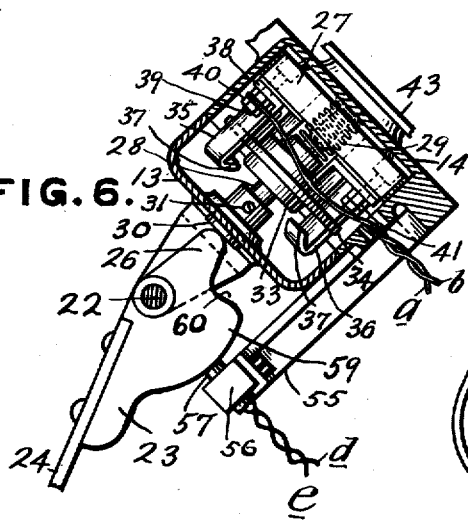
INVENTOR
Edward P Sheldon
ATT'YS.

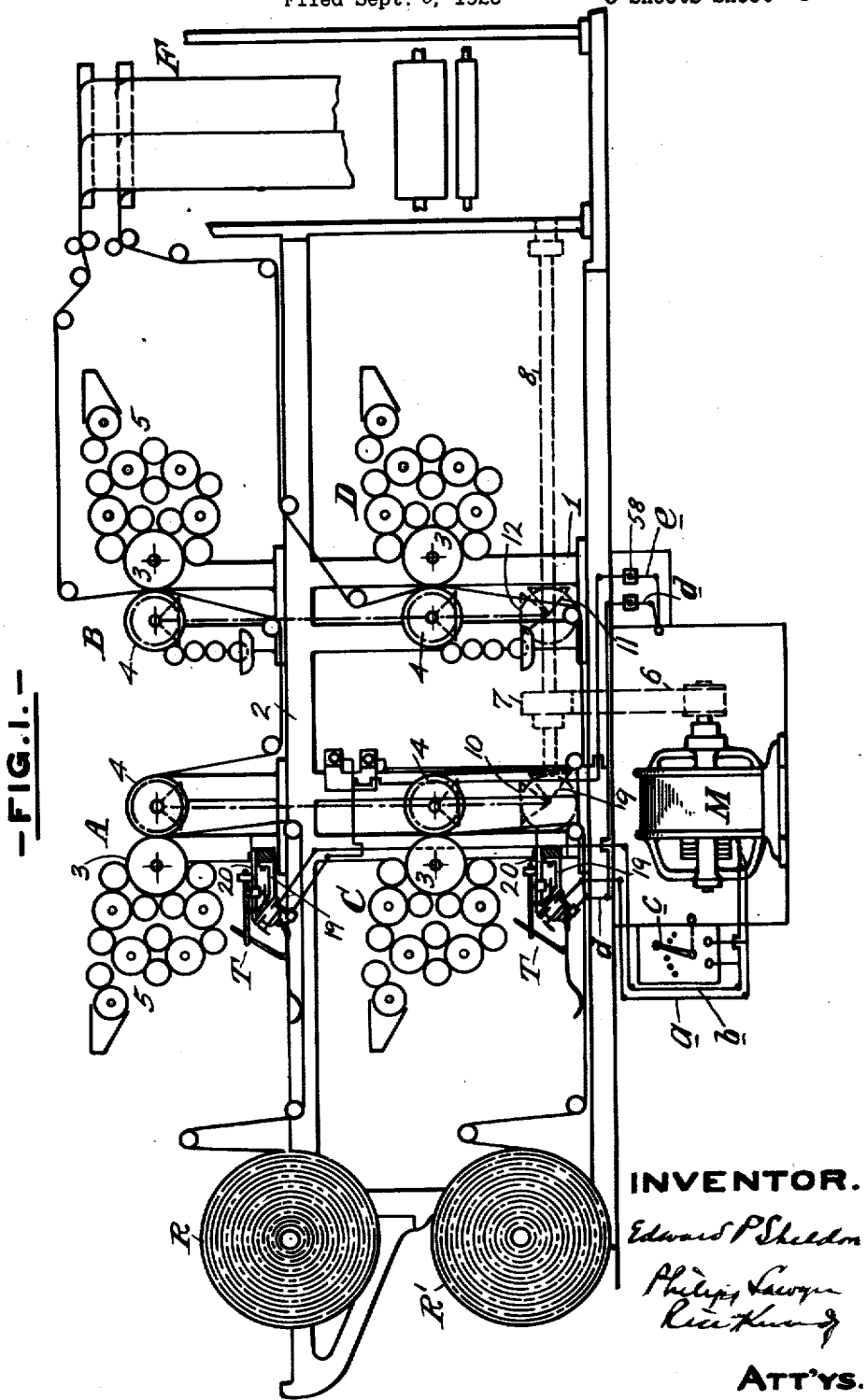

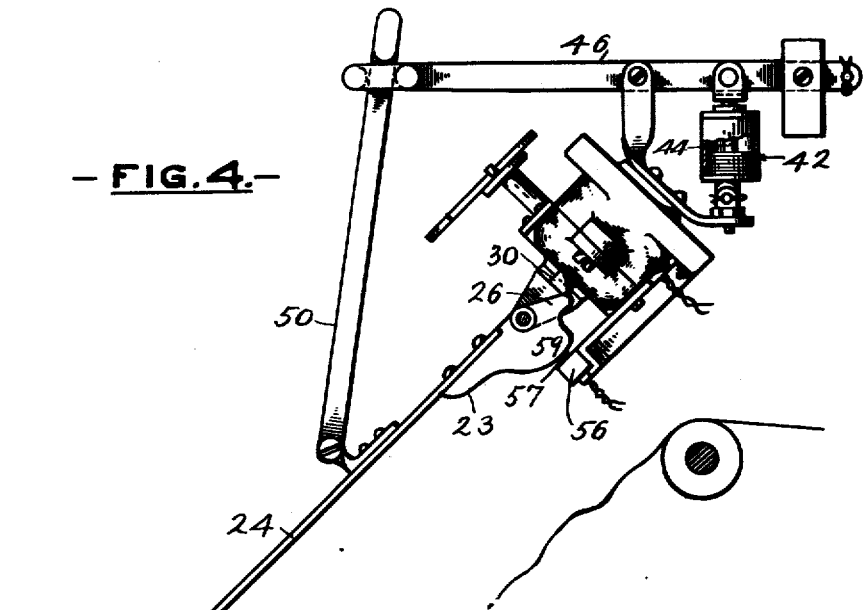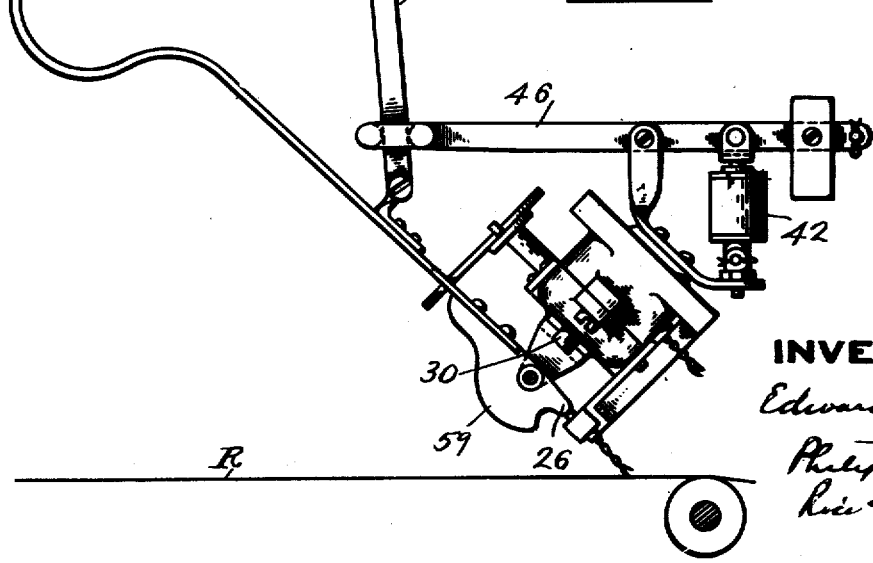

Patented Oct. 23, 1928.

1,688,835

UNITED STATES PATENT OFFICE.

EDWARD P. SHELDON, OF BROOKLYN, NEW YORK, ASSIGNOR TO R. HOE & CO., INC., OF NEW YORK, N. Y., A CORPORATION OF NEW YORK.

PAPER-BREAK INDICATOR.

Application filed September 3, 1925. Serial No. 54,172.

This invention relates to certain improvements in detector mechanism for stopping a web handling machine in case of a break in the web, such as a printing press.

In a copending application of Stanley A. Comiskey, Serial No. 750,983, there is shown and described a detector mechanism which in the case of a break in the web acts to stop the press, the operating parts of the mechanism being returned automatically to operative position so that the detector mechanism does not have to be reset, and after the break is repaired the press may be run without resetting the actuating mechanism of the detector. Where a large number of detector mechanisms are employed, such as in the large multi-web printing machines which are at present largely in use, it is difficult for the pressman to know which of the detector mechanisms has operated and where the break is in the web.

It is the especial object of the present invention to improve on the detector mechanism of the type referred to by providing means which will be actuated by the movement of the detector to indicate to the pressman which detector mechanism has operated, thus enabling him to quickly locate the trouble.

It is a further object of the invention to provide a construction in which the detector is reset automatically to permit the running of the press for web threading, but in which the indicating device will remain on so that the pressman will know which detector mechanism needs to be placed in normal operative position.

With these and other objects not specifically referred to in view, the invention consists in certain novel parts, arrangements and combinations which will be described in connection with the accompanying drawings and the novel features pointed out in the claims hereunto annexed.

In the drawings,—

Figure 1 is a diagrammatic view of a printing machine showing one association of the improved detector therewith, this figure also showing the driving motor for the machine, the switch circuit for the motor, and the circuit for the indicating or signaling device;

Figure 2 is a side view of the detector mechanism showing the parts in the position they occupy when the detector finger is in contact with the web and the parts are in normal running position;

Figure 3 is a similar view showing the parts in the position they occupy when a break in the web has caused the detector mechanism to operate, the motor being cut out and the signal device thrown on;

Figure 4 is a view showing the position of the parts in which the switch mechanism has been automatically returned to operative position, the signal device, however, being on;

Figure 5 is a view showing the position of the parts when the detector finger is lifted out of the way to permit free threading of the web, the signal device being in operative position, and Figure 6 is a detail sectional view of the switch mechanism, the switch for the signal device being shown as in on position.

While the construction selected to illustrate the invention is a printing machine in which the sheet is in the form of a web, it will be understood that the detector mechanism is designed for and capable of use with other types of machines, and with machines in which a sheet as distinguished from a web is being fed.

In the accompanying drawings the printing machine shown includes the usual side frames 1, 2, in which are supported a plurality of printing couples, four such couples being shown, A, B, C, and D. Each of these couples includes form cylinders 3 and impression cylinders 4, these form cylinders being inked by inking mechanism 5 of any approved type. These printing mechanisms are fed from web rolls R, R' and the products are delivered to a folder designated generally by the letter F.

This press is driven from a motor M, the driving connections from the motor being of any suitable character, as a belt 6 and a pulley 7 on a line shaft 8, connections from the line shaft to the printing couples being by means of miter gears 9, 10, 11, 12. A press with but four printing couples has been shown for the purpose of convenience, but it will be understood that any member of couples may be employed, and a detector mechanism will be used at any points in the press necessary or desirable, two of these detector mechanisms, indicated generally by the letter T, being shown as contacting with the webs R, R' as they go to the couples A, C. It will also be understood that all the detector mechanisms are in circuit with the motor M through circuits $a$, $b$, and a switch $c$ so that when any of the detector mechanisms operate the motor is thrown out and the press stopped.

These detector mechanisms are alike and a description of one will be sufficient for an understanding of the invention. The specific construction of these mechanisms may be somewhat varied, but the one shown is preferred, and such mechanism may be briefly described as follows: As shown, this mechanism consists of a two part casing 13, 14, the parts being secured together as by bolts 15 passing through ears 16 on the casing walls. The base of the casing is provided with extensions 17, 18 which are secured in brackets 19, 20 by which the casing may be supported from the machine frame, as shown in Fig. 1. The part 13 of the casing is provided with a pair of extensions, one of which is shown marked 21 which supports a stud 22 on which is pivotally supported a cam plate 23 to which is secured a detector member shown in the form of a finger 24 having a curved end 25 which normally engages the web.

Located within the casing is a switch mechanism which is operated by the movement of the cam plate 23, this plate acting to throw the switch and cut out the motor, it being provided for this purpose with a cam nose 26. While this switch mechanism may be of any suitable character, it preferably will be spring operated so that when the cam nose 26 is moved out of the way the switch will automatically return to operative or on position so that the machine can be run. As shown, the switch mechanism includes a block 27 in which is seated at one end a push rod 28 which is surrounded by a spiral spring 29. This push rod at its outer end has a button 30 and this button inside the casing wall is provided with a set screw 31 which engages the rod 28 and secures the parts together.

Mounted on the push rod within the casing is a collar 33 which carries a contact flange 34 which is proportioned to make contact with two contact members 35, 36, these contacts being in the form of uprights having inturned contacting ends 37. These contacts at their lower ends are formed with legs 38 secured on the block 27 by posts 39 having the usual binding nuts 40, 41 by which the wires $a$, $b$ are secured in the switch.

Means are provided for returning the push button to its normal or operative position. While this may be accomplished in various ways, in the particular construction shown devices are provided which are actuated by the downward movement of the detector member to produce sufficient power to give a return movement of the detector finger to free the push rod from the cam nose 26. In the particular construction shown there is provided for this purpose a small air cylinder 42 which is supported on one end of an arm 43 centrally secured to the bottom member 14 of the casing. The piston rod 44 of this cylinder is connected by means of a pin 45 to an arm 46 pivotally secured at 47 to the other end 48 of the arm 43, before referred to. The arm 46 is slotted, as at 49, to receive the end of a second arm 50 which is pivotally connected at 51 to a plate 52 secured on the upper surface of the detector finger.

To assist the movement of the air cylinder an adjustable weight 53 may be provided secured on the outer end of the arm 46, a stop 54 being provided for preventing the weight from sliding off the arm. With the construction so far described, it will be seen that the dropping movement of the detector finger swings the cam plate 23 so as to bring the cam nose 26 against the push button 30, thus closing the switch and cutting out the motor through the circuits $a$, $b$. This movement through the arms 46, 50 raises the plunger or piston of the air cylinder and compresses air therein. As soon as the parts have reached the position shown in Fig. 3 the weight and the pressure in the cylinder cause the parts to assume the position shown in Fig. 4. The cam nose 26 has ridden off the push button 30 and the spring 29 returns the parts of the switch to operative position so that the motor may be operated and the press run. In accordance with the present invention means are provided whereby when the switch is operated to cut out the motor a second switch is actuated to cause the operation of a suitable visual indicating device. While the specific means for effecting this may be somewhat varied, in the best constructions these means will include a visual signal which is electrically operated, and in the best constructions, furthermore, these means will be actuated by the movement of the cam plate which operates the motor cut out. These means, furthermore, will in the best constructions be such that the signal will remain on after the motor switch has been returned to operative position. While the specific construction for effecting this may vary within certain limits, in the particular construction shown the two part casing 13, 14, before referred to, has secured to one side thereof a bracket 55 which supports at its outer end a switch 56 having a push button 57. This push button is preferably, like the push button 30, a spring operated one, and the switch mechanism may be the same as that described which is operated by the latter push button. This switch is in a circuit $d$, $e$, in which is located a signal device in the form of lamps or other visual electric indicators marked 58, one of these indicators 58 being provided for each detector, as shown in Fig. 1. These signals may be numbered to correspond to different parts of the press so that when one is operated the pressman knows just which part of the press needs attention.

In the construction shown, therefore, the cam plate 23 is provided with a second operating nose 59, this nose 59 being on the same side of the plate as the nose 26 and separated therefrom by a groove 60. The cam plate is so proportioned and the push buttons 30 and 57 so arranged that in certain positions of the cam plate both noses will engage their respective push buttons, as shown in Fig. 3, or the nose 26 will operate either of the push buttons, as shown in Figs. 4, 5.

The operation of the mechanism is briefly as follows: In a normal operation of the mechanisms the parts are shown in Fig. 2 with the curved end 25 of the finger 24 riding on one of the webs, as the web R. Upon a break in the web the parts assume the position shown in Fig. 3, the detector finger dropping. This dropping of the detector finger causes the cam 26 to engage the push button 30, and the cam nose 59 to engage the push button 57. Thus the motor is cut out and the signal given, these operations occurring substantially simultaneously after the parts have reached the position shown in Fig. 3. The operation of the air cylinder slightly raises the detector finger to the position shown in Fig. 4. This movement clears the cam nose 26 from the push button 30 but leaves the cam nose 59 in contact with the push button 57, thus the pressman can start the press for rethreading the web, but the signal remains on so showing the detector finger is out of position. If desired, the parts may be moved to the positions shown in Fig. 5 to give clear access for web threading. When in this position the cam nose 26 engages the push button 57 and lights the signal light, so that as long as any of these signal lights are burning the pressman knows which detector fingers have not been adjusted into operative position with relation to the web.

While the invention has been shown and described in its preferred form, it will be understood that various changes can be made in the specific construction and arrangement of the parts without departing from the invention as defined in the appended claims.

What I claim is:

1. In a web handling mechanism, the combination of a plurality of webs, a detector member for each web located to contact therewith and movable on breakage of a web, means controlled by the detector members to stop the machine, means for automatically returning the controlling mechanism to operative position, and means for indicating which detector member has operated.

2. In a web handling mechanism, the combination of a plurality of webs, a detector member for each web located to contact therewith and movable on breakage of a web, means controlled by the detector members to stop the machine, means for indicating which detector finger has operated, and means for permitting the operation of the machine while the indicating devices remain operative.

3. In a web handling mechanism, the combination of a plurality of webs, a detector mechanism for each web located to contact therewith and movable on breakage of a web, a motor, a circuit, a switch therein, a signal circuit, a switch therein, and means whereby the movement of a detector member may operate both switches to open the motor circuit and close the signal circuit the latter remaining closed after the motor circuit has again been closed.

4. In a web handling mechanism, the combination of a plurality of webs, a detector mechanism for each web located to contact therewith and movable on breakage of a web, a motor, a circuit therefor, a switch in the motor circuit, a signal circuit, a switch therein, means whereby the movement of the detector member operates both switches, and means for returning the motor switch to on position to permit the motor to run, the signal switch remaining in on position.

5. In a web handling mechanism, the combination of a plurality of webs, a detector member for each web located to contact therewith and movable on breakage of a web, a motor, a switch controlling the motor, a signal, a switch controlling the signal, and a cam operated by the detector and having a face for engaging the motor switch and a face for engaging the signal switch.

6. In a web handling mechanism, the combination of a plurality of webs, a detector member for each web located to contact therewith and movable on breakage of a web, a motor, a signal, a casing, switch mechanism carried by the casing for the motor and signal, and a cam having spaced operating faces for engaging both switches.

7. In a web handling mechanism, the combination of a plurality of webs, a detector member for each web located to contact therewith and movable on breakage of a web, a motor, a switch controlling the motor, a signal, a switch controlling the signal, a cam operated by the detector and having a face for engaging the motor switch and a face engaging the signal switch, and means whereby the cam may be freed from the motor switch and remain in contact with the signal switch.

8. In a web handling mechanism, the combination of a plurality of webs, a detector member for each web located to contact therewith and movable on breakage of a web, a circuit for each member, a signal for each circuit located at a common point in the machine, and means whereby the machine may run, while the signal continues to show.

In testimony whereof, I have hereunto set my hand.

EDWARD P. SHELDON.